Nov. 9, 1965   C. C. SIMS   3,217,288
NOISE MEASUREMENT HYDROPHONE
Filed July 26, 1961
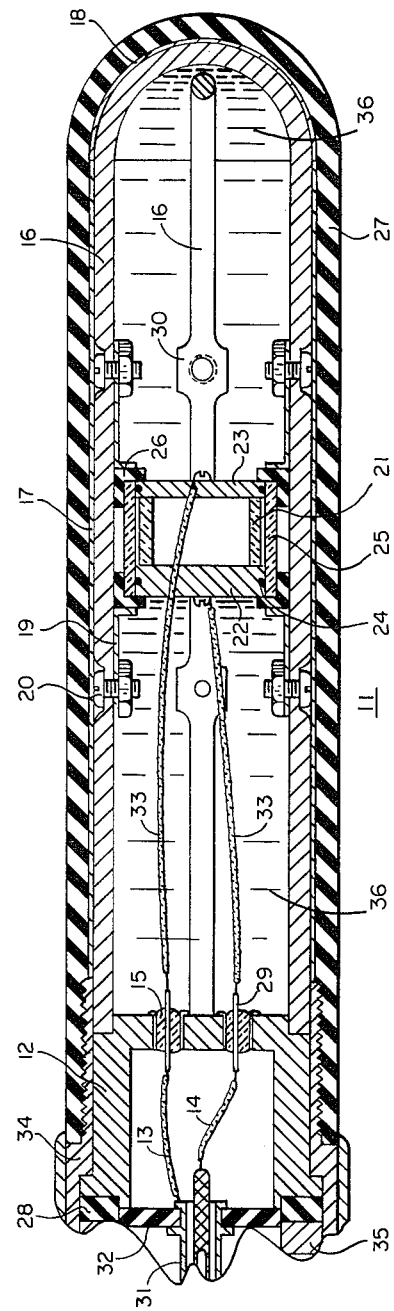
INVENTOR
CLAUDE C. SIMS
BY
ATTORNEY

3,217,288
NOISE MEASUREMENT HYDROPHONE
Claude C. Sims, Orlando, Fla., assignor to the United States of America as represented by the Secretary of the Navy
Filed July 26, 1961, Ser. No. 127,069
6 Claims. (Cl. 340—10)
(Granted under Title 35, U.S. Code (1952), sec. 266)

The invention described herein may be manufactured and used by or for the Government of the United States of America for governmental purposes without the payment of any royalties thereon or therefor.

The present invention relates to an underwater sound transducer for converting sound energy to electrical energy or the reverse. More specifically the invention relates to a hydrophone for measuring the noise radiated into seawater by various types of self-powered vessels.

There are a number of reasons for measuring the sounds radiating into water by various types of ships. For example, when using underwater sound ranging equipment, it is often necessary to identify a particular ship, which may be obscured by the sounds from other ships or marine life in the area. Accurate measurements coupled with a proper preliminary study makes such identifications possible. One by-product of such studies is the design of a quieter type of ship which produces less disturbance to sensitive instruments or marine life in adjacent waters. Perhaps the most important use of information obtained with noise measuring gear is that which may be used in diagnostic manner to determine mechanical failures which develop within a ship.

To provide suitable noise measurements, the equipment used should have certain desirable characteristics. One of these is a high sensitivity which is relatively constant or flat up to at least 10 kilocycles beginning at very low frequencies in the subaudible range. Frequencies within this range are particularly significant in identifying the type of sounds mentioned above. It is also desirable that the pickup probe have an omnidirectional pattern. This eliminates errors in measurements due to incorrect orientation of the probe. Since these measurements are often taken in a preselected environment and the probes are permanently mounted, it is desirable that the hydrophones used be designed for a long life under water. In addition to the characteristics mentioned above it is also desirable that the hydrophones be economical, easy to make and easy to service.

Hydrophones previously used lacked several of these characteristics. One example of such a hydrophone is a model using two ammonium di-hydrogen phosphate crystals. The crystals were each symmetrical about a plane and were spaced apart with their planes of symmetry at right angles to one another in order to provide an omnidirectional pattern. The non-radiating faces of the crystals were covered with a layer of rubber mixed with ground cork and mounted in an oil filled housing. This arrangement worked well up to 5 kc. after which an excess of vertical directivity in the pattern began to appear. Also, with time, the oil penetrated into the rubber and cork layer causing a further loss of sensitivity. Since the crystal faces were in direct contact with the oil, the oil had to be completely free of moisture. With time, however, water did penetrate into the oil and the crystal.

An object of the present invention, therefore, is to provide a hydrophone of the type described above for measuring noise and which is omnidirectional up to a frequency of 10,000 cycles/sec.

A further object of the invention is to provide a novel hydrophone of the type described above which has a very long underwater life.

Yet another object is to provide a hydrophone of the type described above which is easy to manufacture and repair, yet is economical.

These and other objets of the invention are best understood with reference to the drawings wherein is shown a hydrophone 11 according to the principles of the present invention. The hydrophone includes the base assembly with a base 12, two wicket-like frame members 16 supporting a crystal assembly and an outer shield or housing.

The base assembly includes base 12 which may have many different shapes, but in the example illustrated consists of a hollow cylinder of revolution with a closed end, the end having two apertures therein. Each aperture contains a glass seal 15 through which extends a conducting pin 29. Any of the large number of graded glass to metal seals used in the vacuum tube art are suitable.

Each of the frame members has a plurality of flat portions 30 along its length, drilled to provide mounting apertures. The frame members are soldered or cemented to the base 12. The crystal assembly itself includes a hollow cylindrical crystal motor 21 polarized along the axis of the cylinder. A low mass diaphragm 23 is cemented across the open front end of the crystal motor, and a high mass diaphragm 22 is cemented across the rear open end of the crystal motor. The narrow edge portion of each diaphragm is grooved to provide a recess for an O-ring seal 24. A tubular glass sleeve 25 is slipped over the diaphragms and O-ring seals compressing the latter.

To mount the crystal assembly on the base assembly a plurality of resilient mounts 26 are inserted between the crystal assembly and the frame members 16. Mounting clips 19 are placed against the mounts 26 and the frame members 16 and held in place by fasteners 20 inserted through the apertures in the flattened portions 30 of the frame members.

The electrical connections are made through a coaxial line having an outer hollow conducting sleeve 31 and an inner insulated solid conductor 14. The sleeve 31 is cemented through the central aperture of a Synthane washer 32 which abuts the rear end of the base 12. Synthane is a well known phenol formaldehyde resin product which is described in detail by Zimmerman and Lavine in the Handbook of Material Trade Names, 1953 edition. The inner conductor 14 is connected to one of the conducting pins 29 and the outer conductor is connected through lead 13 to the other. On the opposite side of the base a pair of crystal leads 33 each interconnect one of the conducting pins to one of the diaphragms as shown. The base and crystal assemblies slide into and abut the end of an elongated housing sleeve 34.

The end of the housing sleeve together with a cylindrical shield 17 and a shield cap 18 provide a waterproof barrier and field free space around the crystal assembly. The cylindrical housing shield is just large enough to provide a snug fit around the frame member 16 and the shield cap fits snugly over the ends of these same members. To provide better electrical connection to the frame members, the cylindrical shield may be perforated, if desired, and one of the fasteners 20 inserted after the shield is in place. The housing sleeve, cylindrical shield and shield cap are sweated together.

In addition to waterproofing, a degree of shockproofing is desirable. In the present embodiment this is obtained by covering the entire unit with a boot 27 of plastic material. The electrical connections at the rear end of the transducer are protected in the usual manner as by using the soft plastic washer 35 which is held in place by means of a threaded retaining nut, not shown, in the housing sleeve 34.

The various parts of the hydrophone are made from readily obtainable materials. For example the base assembly is conveniently made from stainless steel. The crystal itself is lead zirconate titanate ceramic. The low mass diaphragm is made from aluminum and the high mass diaphragm from stainless steel. The sealing sleeve 25 is made from glass. The plastic portions such as the ring seals 24, mounts 26, boot 27 and the gasket 28 may be made from either rubber or vinyl resin. The housing sleeve 34 is easily machined from brass. The cylindrical shield 17 and shield cap 18 may be made from metal foil, such as for example, copper, aluminum, gold, or silver plated with gold. The crystal and diaphragms are cemented together using an epoxy resin or similar cement. The same cement may be used to bond the boot to the outer surface of the shield assembly. The interior of the hydrophone housing is flooded with a good grade of castor oil 36.

Proper dimensioning of the crystal motor parts is necessary to provide high sensitivity and proper impedance matching. The crystal presently used is approximately 1 inch in diameter and has a length of 0.532 inch. The low mass and the high mass diaphragms are one eighth and one quarter inch thick, respectively. The ratio of the areas of the radiating faces of the diaphragms to that of the crystal element is 2.29.

The performance of the resulting hydrophone is greatly improved over that of its predecessor. The horizontal pattern was found to be omnidirectional within ½ db over the frequency range from 5 cycles per second to 20 kc. The vertical directivity was found to be omnidirectional within approximately 3 db to 10 kc. The sensitivity from 5 cycles to 10 kc. is far greater and smoother than that of the hydrophone previously mentioned.

Obviously many modifications and variations of the present invention are possible in the light of the above teachings. It is therefore to be understood that within the scope of the appended claims the invention may be practiced otherwise than as specifically described.

What is claimed is:
1. A transducer for the conversion of sonic vibrations in a fluid medium to electrical energy comprising; a hollow cylindrical sealing sleeve of rigid waterproof material, a cylindrical axially polarized crystal motor located within said sleeve and spaced therefrom in substantially coaxial relationship; a low mass diaphragm cemented to one axial end of said crystal motor; a relatively high mass diaphragm cemented to the opposite axial end of said motor, said diaphragms being within and spaced from said sleeve with a peripheral groove in the surface of each adjacent said sleeve; an O-ring of resilient material mounted in each said groove and engaging the inner surface of said sleeve to position said motor and diaphragms; a closed hollow cylindrical housing surrounding said sleeve; resilient mounting means for supporting said sleeve in spaced relationship to the inner walls of said housing; and a liquid medium filling the space separating the housing and said sleeve and contacting both of said diaphragms.

2. The transducer according to claim 1 wherein said crystal motor is made from lead zirconate titanate.

3. The transducer according to claim 1 wherein said low and high mass diaphragm are made from relatively low and high density metals, respectively.

4. The transducer according to claim 1, wherein said sleeve is made from a ceramic material.

5. The transducer according to claim 1 wherein said housing includes a thick outer layer of plastic material and a relatively thin metal shielding layer.

6. The transducer according to claim 1 wherein said sleeve is made of glass.

References Cited by the Examiner
UNITED STATES PATENTS

| | | | |
|---|---|---|---|
| 2,605,346 | 7/52 | Gogolick et al. | 340—10 |
| 2,613,261 | 10/52 | Massa | 340—10 |
| 2,930,912 | 3/60 | Miller | 340—10 |
| 2,961,637 | 11/60 | Camp | 340—10 |
| 3,054,982 | 9/62 | Kieser | 340—10 |

FOREIGN PATENTS

| | | |
|---|---|---|
| 815,873 | 7/59 | Great Britain. |

CHESTER L. JUSTUS, *Primary Examiner.*